United States Patent [19]
Walrath

[11] Patent Number: 5,351,982
[45] Date of Patent: Oct. 4, 1994

[54] CLUSTER BALL TRAILER HITCH

[75] Inventor: Alden B. Walrath, Plantation, Fla.

[73] Assignee: W.H.P. Innovations Inc., Boynton Beach, Fla.

[21] Appl. No.: 66,228

[22] Filed: May 25, 1993

[51] Int. Cl.$^5$ ................................................ B60D 1/07
[52] U.S. Cl. ........................... 280/416.1; 280/495; 280/502; 280/504; 280/511
[58] Field of Search ............... 280/415.1, 416.1, 495, 280/500, 501, 502, 504, 511

[56] References Cited
U.S. PATENT DOCUMENTS

| | | | |
|---|---|---|---|
| 2,911,233 | 11/1959 | Riddle | 280/416.1 |
| 4,022,490 | 5/1977 | Rocksvold | 280/500 |
| 4,456,279 | 6/1984 | Dirck | 280/416.1 |
| 5,044,652 | 9/1991 | Brisson | 280/416.1 |
| 5,106,114 | 4/1992 | Haupt | 280/416.1 |
| 5,158,316 | 10/1992 | Hutchmacher | 280/415.1 |

*Primary Examiner*—Mitchell J. Hill
*Attorney, Agent, or Firm*—Jacobson, Price, Holman & Stern

[57] ABSTRACT

A generally plate-like mounting member is provided for rigid securement to a tow hitch area of a towing vehicle and the mounting member is of non-circular configuration in plan shape and includes upwardly convergent inclined peripheral edges. A generally horizontal plate-like fixture is provided and includes a downwardly opening cavity of a shape complimentary to the shape of the mounting member with the side walls of the cavity also being upwardly convergent so as to match the inclination of the peripheral edges of the mounting member. The upper side of the fixture includes a plurality of tow hitch balls projecting upwardly therefrom in horizontally spaced relation and the plan shape of the mounting member and cavity is such that the fixture may be downwardly secured over the mounting member in a plurality of predetermined rotated positions about a vertical axis relative to the mounting member equal to the number of hitch ball members mounted from the fixture. The depth of the cavity is slightly greater than the height of the fixture such that tightening of the fastener will flex the central area of the fixture downwardly toward the central area of the mounting member to ensure that the matching inclination of the peripheral edges of the mounting member in the walls of the cavity will form a rigid wedge type connection between the mounting member and the fixture.

18 Claims, 2 Drawing Sheets

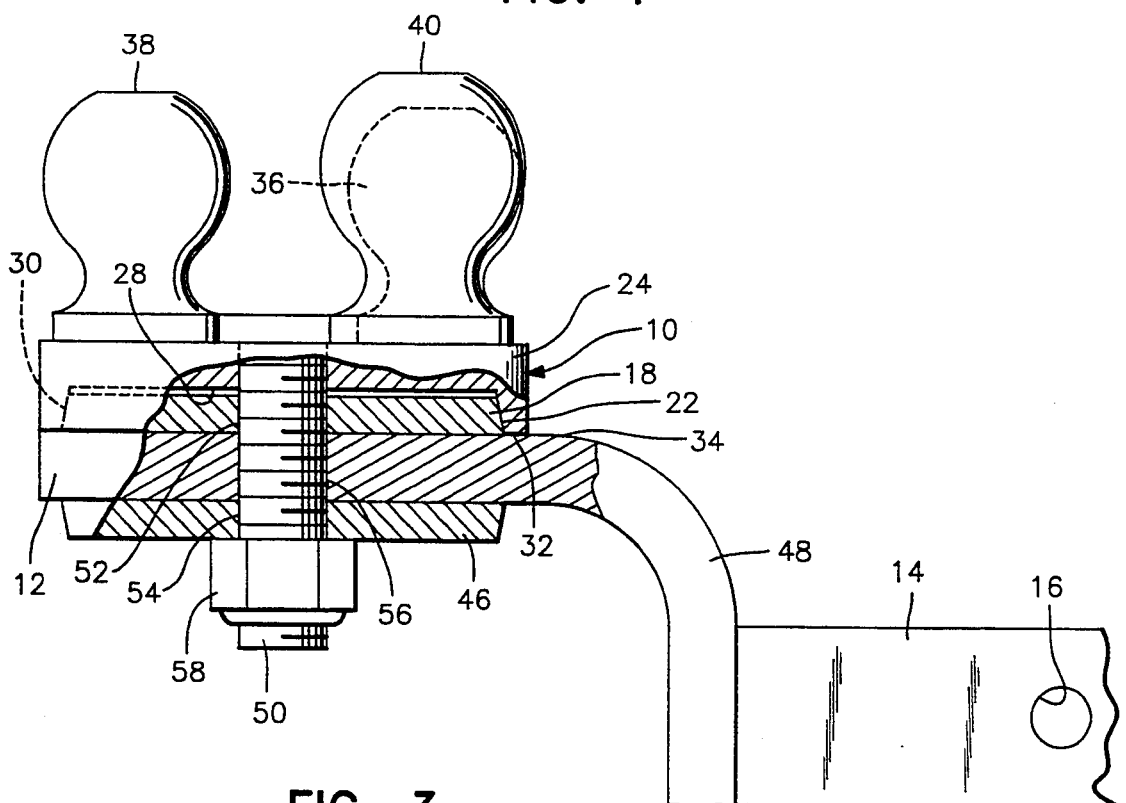
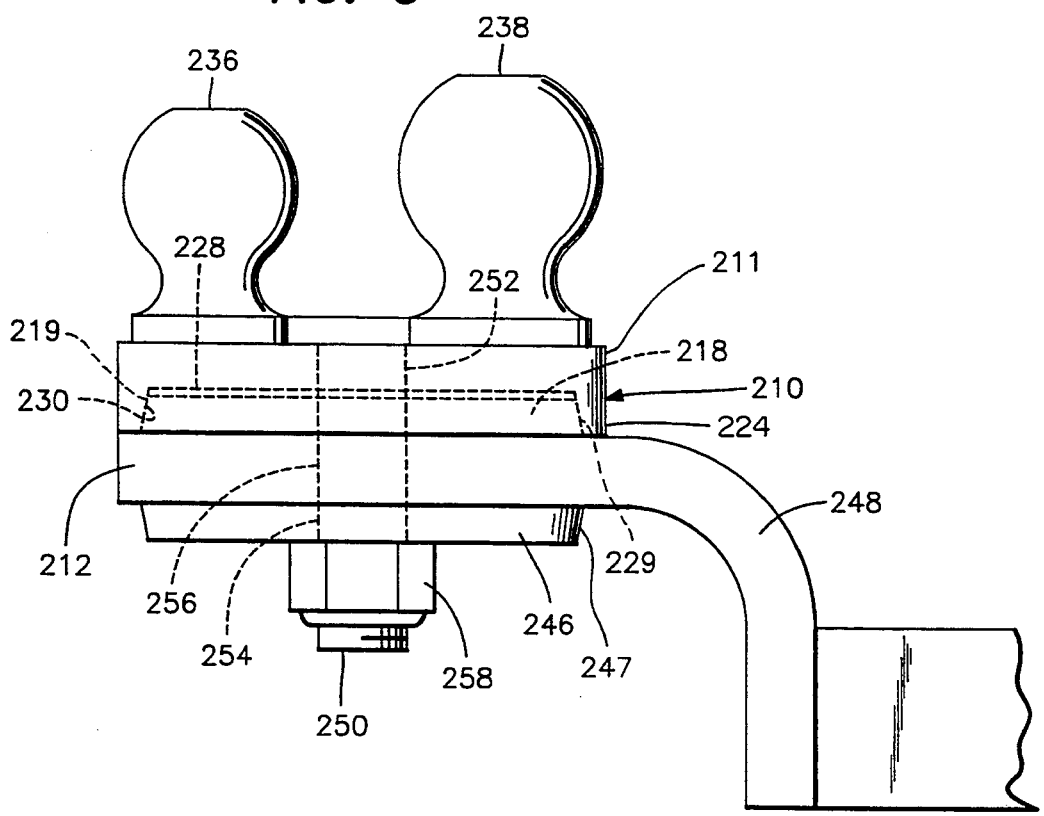

CLUSTER BALL TRAILER HITCH

BACKGROUND OF THE INVENTION

1. Field of the Invention

This invention relates to a trailer hitch for a towing vehicle wherein two or three different sizes of hitch balls are provided for alternate use.

In many instances a vehicle utilized for towing purposes may be used to tow a small trailer having a ball receiver on the towing tongue thereof specifically designed to receive and be coupled to a hitch ball having a diameter of 1⅞ inches. On the other hand, a towing vehicle also may be used for towing a medium weight trailer equipped with a ball receiver for receiving a hitch ball 2 inches in diameter. Still further, some heavier trailers such as horse trailer and large construction and boat trailers are equipped with hitch ball receivers adapted for use in conjunction with a hitch ball of 2 5/16 inches in diameter.

Inasmuch as the same towing vehicle may be used, occasionally or frequently, for towing each of the above mentioned types of trailers, there is a need to provide a tow hitch for a vehicle from which two or three different size hitch balls are supported to be alternately used as required and with a minimum of manipulation of the hitch in order to adapt the same for its use with a specific hitch ball supported therefrom.

Although multiple hitch ball member hitch constructions heretofore have been provided, most require considerable manipulation to switch from one hitch ball use to use of another hitch ball thereon and, further, although some hitch ball hitches are constructed in a manner whereby a hitch ball of one size supported therefrom may be removed and replaced by a hitch ball of another size, this replacement procedure takes a considerable amount of time and requires that the one or two replacement hitch balls always be available for replacement use, when desired. Thus, a vehicle equipped with only a single hitch ball hitch must carry therein one or two replacement hitch balls if the associated towing hitches to be converted from one hitch ball size to another.

2. Description of Related Art

Various different forms of multiple hitch ball hitches heretofore have been provided such as those disclosed in U.S. Pat. Nos. 2,911,233, 4,022,490, 4,456,279, 5,044,652 and 5,106,114. However, these previously known form of hitch constructions do not include the overall combination of structural features of the instant invention which together coact to provide a hitch base member with which a multiple hitch ball supporting fixture may be cooperatively engaged in a plurality of relatively rotated positions in a manner insuring rigid support of the fixture from the base member.

SUMMARY OF THE INVENTION

The cluster ball trailer hitch of the instant invention includes a horizontally disposed hitch base member which may be secured to the center step plate of a truck step bumper or to the rear end of a hitch bar whose forward end is adapted for removable telescopic securement within the rearwardly opening of a receiver-type of hitch. In addition, the trailer hitch includes a horizontal fixture defining a downwardly opening recess and the fixture may be secured over the base member with the latter wedgingly seated within the recess, the hitch base member and recess being of non-circular plan shape with the fixture being selectively mountable on the hitch base member in a plurality of rotated positions relative thereto about a vertical axis and the fixture including a plurality of hitch balls supported therefrom equal in number to the selective positions in which the fixture may be rotated relative to the base member with each rotated position of the fixture relative to the base member positioning one of the plurality of ball members supported from the fixture disposed rearmost.

The main object of this invention is to provide a cluster ball trailer hitch which will enable a towing vehicle to have one of a plurality of different size hitch balls shifted into position for towing purposes.

Another object of this invention is to provide a hitch construction in accordance with the preceding object and wherein the hitch ball shiftable portion of the hitch construction may be rigidly and wedgingly secured in adjusted position.

Still another important object of this invention is to provide a hitch construction in accordance with the preceding objects which may be readily adapted for use in connection with the center step plate of a truck step bumper or the rear end of a hitch bar for removable telescopic securement within a receiver type hitch frame.

A final object of this invention to be specifically enumerated herein is to provide a hitch construction in accordance with the preceding objects and which will conform to conventional forms of manufacture, be of simple construction and easy to use so as to provide a device that will be economically feasible, long lasting and relatively trouble free in operation.

BRIEF DESCRIPTION OF THE DRAWINGS

FIG. 1 is a side elevational view of a trailer hitch constructed in accordance with the present invention and mounted from the rear end of the hitch mounting bar of a receiver type hitch, parts of the hitch and mounting bar being broken away and illustrated in vertical sections;

FIG. 3 is a side elevational view similar to FIG. 1 but illustrating a modified form of trailer hitch incorporating only two different size hitch balls;

DETAILED DESCRIPTION OF THE INVENTION

Figure 2:
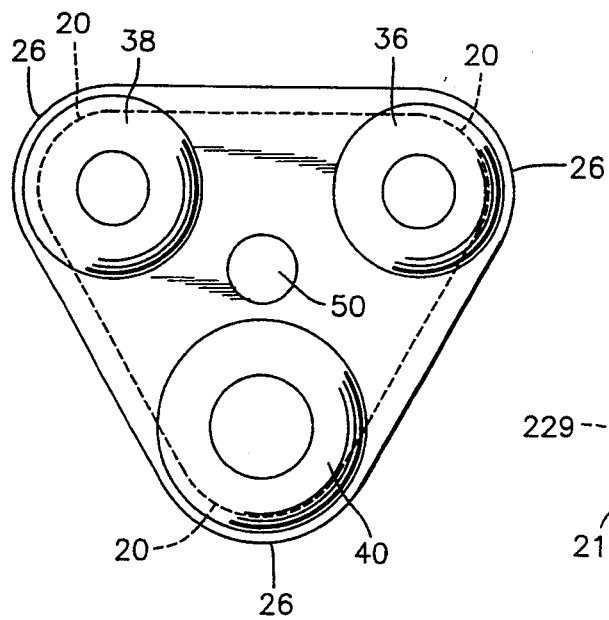
FIG. 2 is a top plan view of the hitch construction illustrated in FIG. 1 and with the hitch bar omitted.

Referring now more specifically to FIGS. 1 and 2 of the drawings, the cluster ball trailer hitch of the instant invention is referred to in general by the reference numeral 10. The hitch 10 is illustrated in FIG. 1 as mounted on the rear vertically offset end 12 of a removable hitch bar whose forward end 14 includes a transverse bore 16 and is adapted to be secured by means of a removable transverse pin (not shown) within a receiver-type hitch (not shown) secured to the rear of a towing vehicle, the pin being passed through the receiver-type hitch and the bore 16.

The hitch 10 includes horizontal, non circular equilateral triangular shaped base or plate like member 18 which is disposed horizontally and secured to the upper side of the rear vertically offset end 12 in any convenient manner. The base member 18 includes rounded corners or apex portions 20 and first remote, upwardly convergent peripheral edges 22 inclined relative to the horizontal between 45° and 89°.

In addition, the hitch 10 includes a horizontally disposed fixture 24 which is also triangular in shape including rounded corners or apex portions 26 and the fixture 24 is slightly larger plan area than the base member 18.

The underside of the fixture 24 includes a downwardly opening cavity or recess 28 which also is triangular in configuration and including second remote upwardly convergent inclined peripheral walls 30 or edges whose inclination corresponds to the inclination of the peripheral edges 22.

Further, the depth of the recess 28 is slightly greater than the height of the base member 18 and the plan size of the base member 18 in relation to the plan size of the recess 28 is such that tight wedging engagement of the fixture 24 downwardly over the base member 18 results in the bottom surfaces 32 of the fixture 24 being slightly spaced above the upper surface 34 of the rear end portion 12.

The three corner or apex portions 26 of the fixture 24 support three upwardly projecting ball members 36, 38 and 40 therefrom, all of different sizes. The ball member 36 may be 1⅞ inches in diameter, the ball member 38 may be 2 inches in diameter and the ball member 40 may be 2 5/16 in diameter and the spacing between the ball members is such to enable the socket hitch structure of an associated trailer to be received over whichever ball member 40 is disposed rearmost and without interference with the other two ball members during turning maneuvers.

It will be noted from FIG. 1 of the drawings that the underside of the rear vertically offset end 12 has a second inverted, base or plate-like member 46 rigidly secured thereto and which is identical to and usable in conjunction with the fixture 24 when the hitch bar 48 is in inverted. Thus, not only does the trailer hitch 10 provide structure by which trailer equipped with three different sizes of socket structures to be coupled thereto, but the height of the coupling connection relative to the towing vehicle also may be varied.

The fixture 24 includes a center downwardly projecting threaded mounting shank 50 and the two base members 18 and 46 include central bores 52 and 54 formed therethrough registered with a central bore 56 formed through the rear end portion 12. The mounting shank 50 may be secured through the bores 52, 54 and 56 through the utilization of a suitable nut 58.

By having the recess 28 slightly deeper than the height of the base member 18 and the fixture 24 is downwardly receivable over either the base member 18 or the base member 46 in a manner such that the undersurface 32 of the fixture 24 is slightly spaced above the upper surface 34 of the rear vertically offset end 12. Thus, tightening of the nut 58 will draw the central portion of the fixture 24 downwardly slightly toward the base member 18 or the base member 46 such to insure that the inclined peripheral edges 22 of the fixture 24 will firmly wedgingly seat against the inclined marginal edges 30 of the base member 18, thus insuring that the fixture 24 is removably rigidly supported from the rear vertically offset end 12 of the hitch bar 48.

The ball members 36, 38 and 40 may be formed integrally with the fixture 24 or may include short shank portions tightly received and welded within appropriate bores provided therefore opening into the recess 28.

Figure 5:
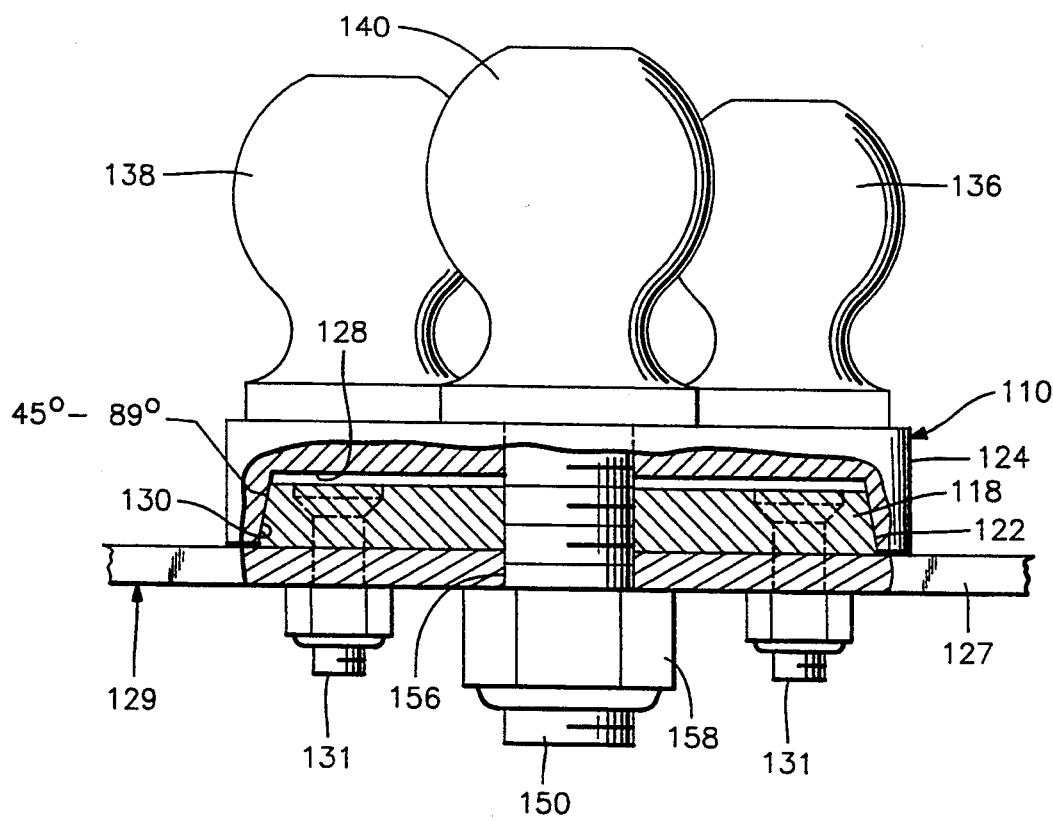
FIG. 5 is a rear elevational view of a trailer hitch similar to the three ball trailer hitch illustrated in FIG. 1, but mounted upon the center step of a truck step bumper, portions of the hitch and step being broken away and illustrated in vertical section.

With attention now invited more specifically to FIG. 5, there may be seen a first modified form of trailer hitch referred to in general by the reference numeral 110 and which is substantially identical to the trailer hitch 10, with the exception that the base member 118 thereof is secured to the center step plate 127 of a truck step bumper 129 through the utilization of a pair of bolts 131. In this instance, the mounting shank 150 is secured downwardly through a bore 156 formed in the step 127 through the utilization of a threaded nut 158, all of the various other components of the trailer hitch 110 corresponding to the similar components of the trailer hitch 10 being designated by reference numerals in the 100 series corresponding to the reference numerals given the various components of the trailer hitch 10.

Figure 4:
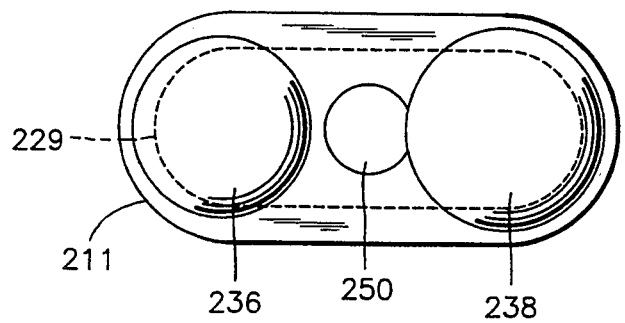
FIG. 4 is a top plan view of the trailer hitch illustrated in FIG. 3 with the hitch bar omitted.

Referring now more specifically to FIGS. 3 and 4, a second modified form of trailer hitch 210 is illustrated as mounted on a hitch bar 248 corresponding to the hitch bar 48. The trailer hitch 210 includes first and second upper and lower horizontal base or plate-like members 218 and 246 which are oblong in shape having rounded opposite end portions 219 and 247, respectively and correspond to the base members 18 and 46. Further, the hitch 210 includes an oblong fixture 224 including rounded opposite end portions 211 and equipped with an oblong recess 228 also including rounded opposite end portions 211. The peripheral walls 230 of the recess 228 are upwardly convergent and inclined as are the peripheral edges 224 of the base member 218. Further, the recess 228 is slightly deeper than the height of the base member 218 and the base member 246 and, therefore, the center mounting shank 250 of the fixture 224 also downwardly flexes the central portion of the fixture 224 in order to insure that the peripheral edges 222 are tightly wedgingly seated against the marginal walls 230 of the recess 228 when the threaded nut 258 is tightened on the shank 250, the latter passing downwardly through bores 252 and 254 formed in the base members 218 and 246 as well as a central bore 256 formed in the rear vertically offset end 212 of the hitch bar 248.

The opposite ends of the oblong fixture 224 support a pair of balls 236 and 238 therefrom corresponding to the balls 36 and 38. Of course, any two different size balls may be supported from the fixture 224.

In each of the three forms of the invention disclosed, the associated ball members may include either short shanks tightly received and welded within bore provided therefore in the corresponding fixture, or they may be formed integrally with the fixtures. If the fixtures and balls are to be constructed of ferris material, they may be chrome plated. Of course, if the balls and fixtures are to be constructed of stainless steel, further treating thereof against corrosion may be required.

It is believed that it may be readily appreciated that the ball or ball member 40 as illustrated in FIG. 2, if disposed rearmost on the associated towing vehicle, may have access thereto by a socket hitch construction carried by the forward end of an associated trailer and that the trailer and associated towing vehicle may execute turns without interference with the other ball members 36 and 38. This of course is also true when either of the balls 36 and 38 are disposed rearmost. Further, it will be readily appreciated that the same is true with the rearmost ball of the hitch 210 illustrated in FIGS. 3 and 4, the longitudinal extent of the fixture 224 extending lengthwise of the hitch bar 248.

The foregoing is considered as illustrative only of the principles of the invention. Further, since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A cluster ball trailer hitch including a mount for rigid securement to a hitch mounting portion of a towing vehicle, said mount comprising a horizontal plate-like member of predetermined height and of non-circular plan shape and including first remote upwardly convergent peripheral edges inclined upwardly toward a central portion of said member, a horizontal ball supporting fixture defining a downwardly opening cavity of predetermined depth and of a size and shape corresponding to the size and shape of said member and including second remote upwardly convergent inclined peripheral edges which correspond to and are inclined to substantially the same degree as said first remote edges, said fixture being removably downwardly displaced over said member with said first and second remote inclined peripheral edges seated tightly against each other, means removably anchoring said fixture over said member, said fixture including a plurality of different size hitch balls rigidly mounted therefrom and projecting upwardly from said fixture in horizontally spaced apart relation, said fixture cavity and member being of a plan shape allowing said fixture to be secured downwardly over said member in a plurality of predetermined positions rotated relative to said member about an upstanding axis with said plurality of said predetermined positions being equal in number to the number of said plurality of hitch balls and in each of which positions a corresponding hitch ball will be disposed adjacent a predetermined peripheral portion of said member.

2. The hitch of claim 1 wherein said remote upwardly convergent edges are inclined between 45° and 89° relative to the horizontal.

3. The hitch of claim 1 wherein said cavity is of a greater depth than the height of said member.

4. The hitch of claim 3 wherein said member seats within said cavity with a slight portion of said fixture projecting outwardly of said cavity.

5. The hitch of claim 1 wherein said fixture cavity and member are oblong in plan shape with rounded ends.

6. The hitch of claim 1 wherein said fixture cavity and member are equilateral triangular in plan shape having rounded apex portions.

7. The hitch of claim 1 wherein all of the peripheral edges of said member and cavity are upwardly convergent and similarly inclined.

8. The hitch of claim 7 wherein said remote upwardly convergent edges are inclined between 45° and 89° relative to the horizontal.

9. The hitch of claim 7 wherein said cavity is of a greater depth than the height of said member.

10. The hitch of claim 9 wherein said member seats within said cavity with a slight portion of said fixture projecting outwardly of said cavity.

11. The hitch of claim 7 wherein said fixture cavity and member are oblong in plan shape having rounded end portions.

12. The hitch of claim 7 wherein said fixture cavity and member are equilateral triangular in plan shape having rounded apex portions.

13. The hitch of claim 1 wherein said means removably anchoring said fixture downwardly over said member includes a depending shank centrally mounted relative to said fixture and projecting centrally downwardly through said cavity and passed and secured through a central bore formed through said member.

14. The hitch of claim 1 including a step bumper having a center step plate, said mount being removably mounted from said center step plate.

15. The hitch of claim 1 including a removable hitch bar having a rear vertically offset end including an upper side, said mount being mounted from said upper side, said hitch bar including a forward end adapted to be removably anchored within a receiver type hitch of a towing vehicle.

16. The hitch of claim 15 wherein said rear end of said hitch bar includes an underside, a second horizontal plate-like member corresponding to the first mentioned member secured to said underside and including remote inclined peripheral edges which are downwardly convergent, wherein when said hitch bar is mounted in inverted position the inclined remote peripheral edges of the first mentioned and second members will be downwardly and upwardly convergent, respectively.

17. The hitch of claim 16 wherein said fixture cavity and member are oblong in plan shape having rounded end portions.

18. The hitch of claim 16 wherein said fixture cavity and member are equilateral triangular in plan shape with rounded apex portions.

* * * * *